Patented Nov. 14, 1922.

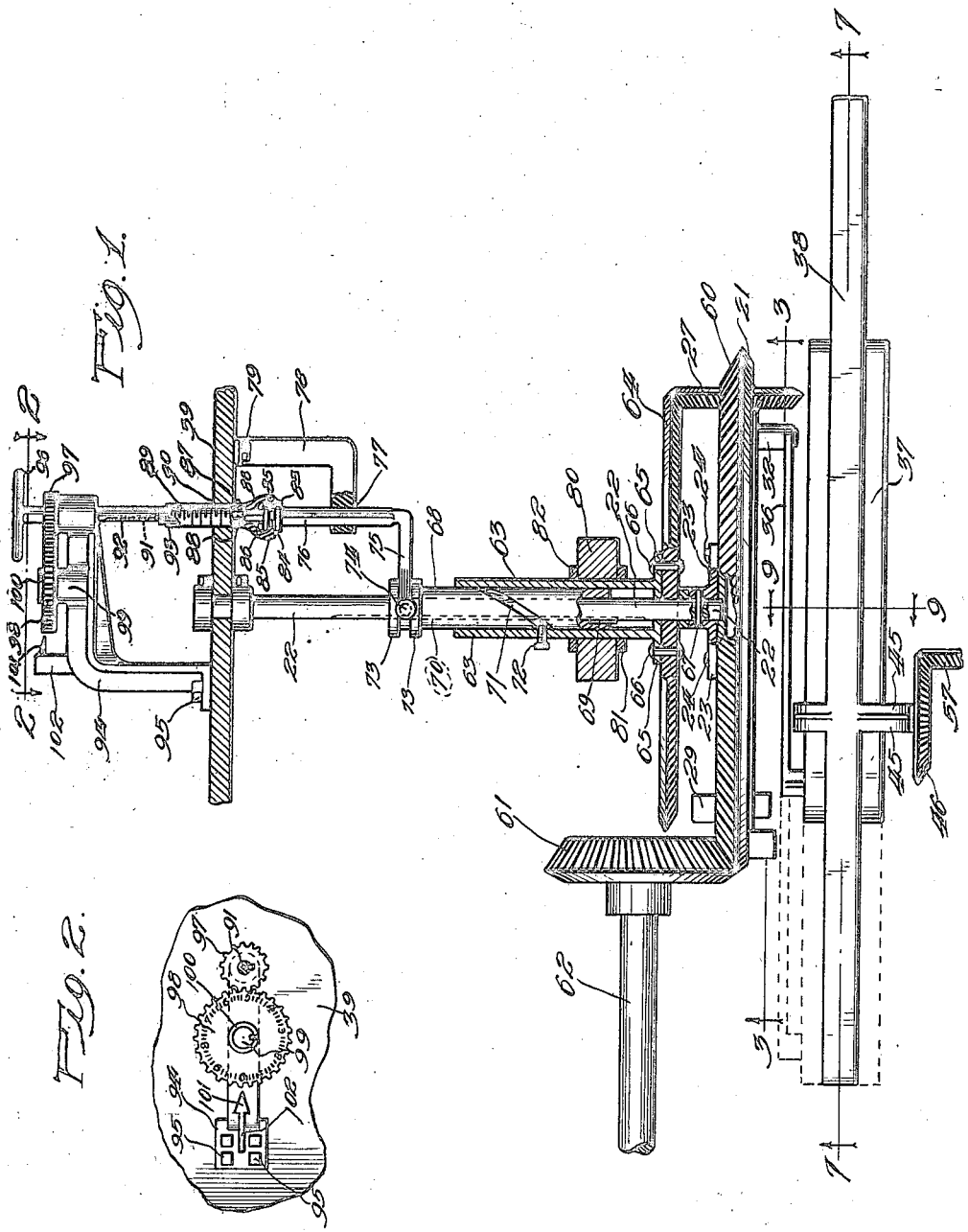

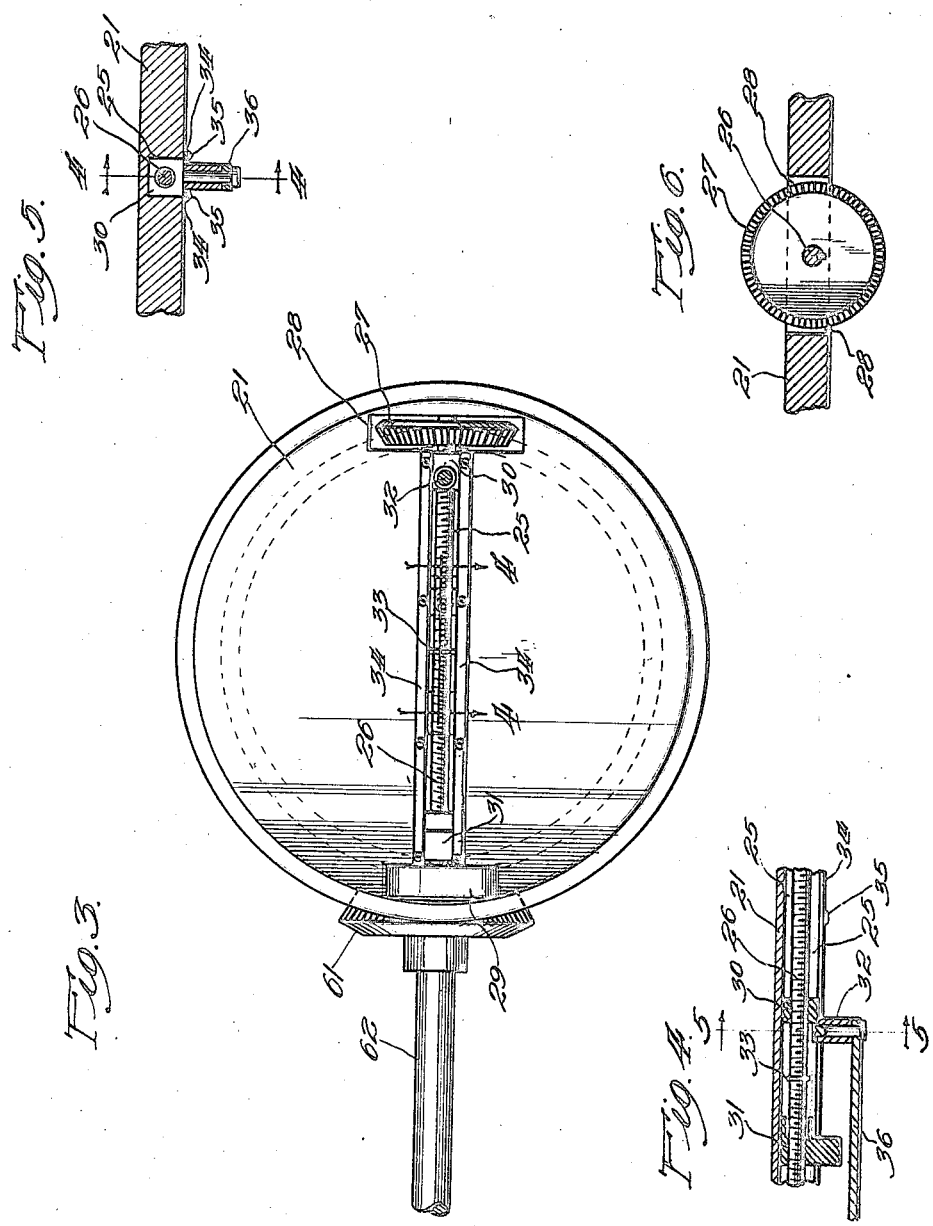

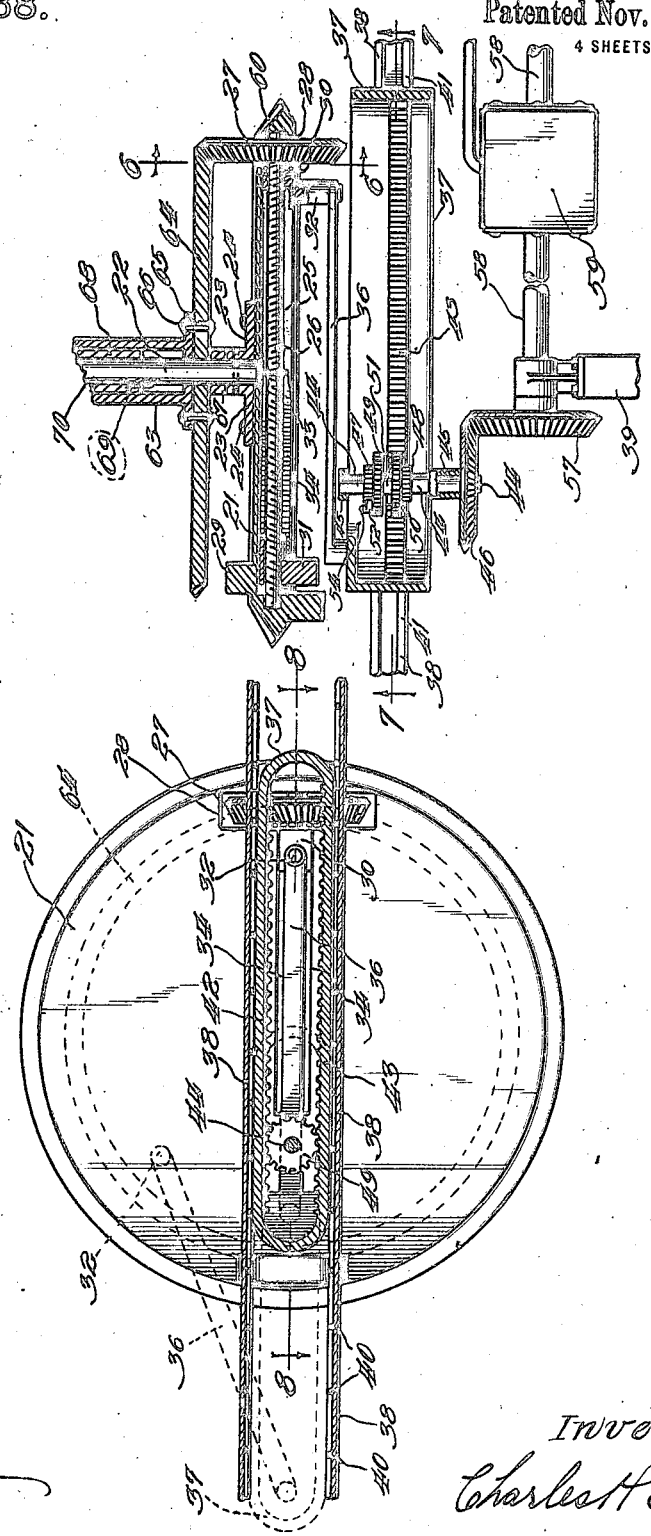

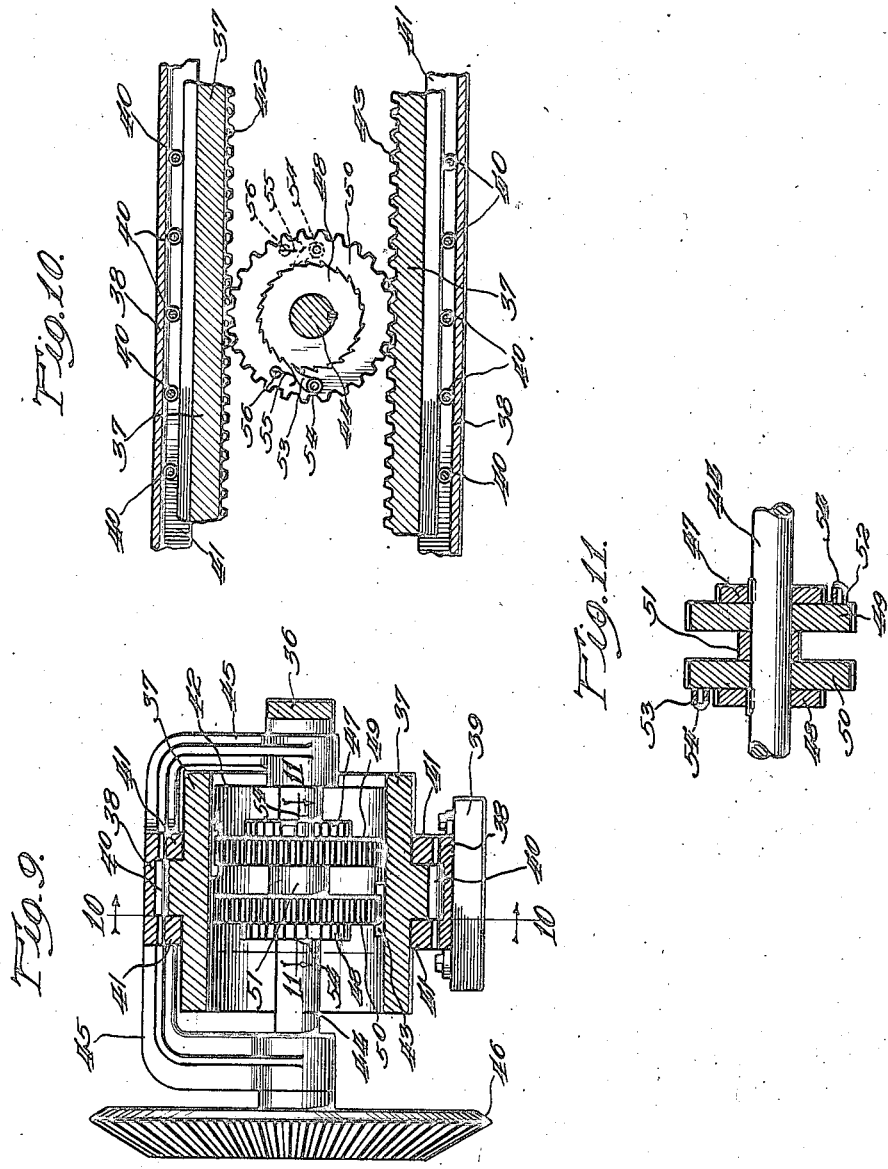

1,435,838

UNITED STATES PATENT OFFICE.

CHARLES H. GILL, OF CHICAGO, ILLINOIS, ASSIGNOR OF ONE ONE-HUNDREDTH TO ERNEST L. FANTUS, OF CHICAGO, ILLINOIS.

CRANK TRANSMISSION MECHANISM.

Application filed January 17, 1921. Serial No. 437,801.

*To all whom it may concern:*

Be it known that I, CHARLES H. GILL, a citizen of the United States, residing at Chicago, in the county of Cook and State of Illinois, have invented a new and useful Crank Transmission Mechanism, of which the following is a specification.

My invention relates to mechanism adapted to transmit motion from a driving member to a driven member and to vary the speed ratio between the driving and driven members at the will of the operator.

The objects of my invention are, first, to provide a crank adapted to be rotated by the source of power; second, to provide means whereby the position of the crank pin may be changed in relation to the axis of rotation of said crank so as to vary the length of throw of a crank rod or to vary the diameter of the circle described by said crank pin at each revolution thereof; third, to provide means under the control of the operator for making the said changes in position of the crank pin while the crank is operating at any speed; fourth, to provide means for automatically maintaining the said crank in balance in the varying positions of the crank pin; fifth, to provide means for converting the rotary motion of the crank into reciprocating motion of a member with the length of the reciprocatory movements governed by the position of the crank pin; and sixth, to provide means for reconverting the reciprocating motion of the said member into continuous rotary motion of a driven shaft.

I attain these objects and others, as will hereinafter appear, by the mechanism illustrated in the accompanying drawings, in which—

Figure 1 is a side elevation and partly sectional view of one form of my invention; Figure 2 is a detail plan section taken on the line 2—2 of Figure 1; Figure 3 is a plan section taken on the line 3—3 of Figure 1; Figure 4 is a detail section taken on the line 4—4 of Figure 3; Figure 5 is a detail section taken on the line 5—5 of Figure 4; Figure 6 is a detail section taken on the line 6—6 of Figure 8; Figure 7 is a plan section taken on the lines 7—7 of Figures 1 and 8; Figure 8 is a section taken on the line 8—8 of Figure 7; Figure 9 is an enlarged detail section taken on the line 9—9 of Figure 1; Figure 10 is a plan section taken on the line 10—10 of Figure 9; and Figure 11 is a detail section taken on the line 11—11 of Figure 9.

Similar numerals refer to similar parts throughout the several views.

I am aware that transmission mechanisms employing a crank pin movable in relation to its distance from the axis of the crank are not new in the art, and that it has been previously proposed to use an internally threaded crank pin block and to adjust it by means of a threaded shaft passing therethrough, and also that methods of translating the reciprocating motion of the crank rod into rotary motion substantially as employed by me have been used or proposed for use. My invention consists only in the means for controlling and causing movement of the crank pin relative to the axis of the crank while the crank is operating and, of the means for automatically balancing the crank in all positions of the crank pin. I am not aware that any method has ever been proposed for adjusting the position of a crank pin as to its distance from the axis of the crank, through the movement of a control member situated upon a stationary support, while the crank is revolving at any desired speed. Neither am I aware that any practical method of automatically adjusting counter-balances to maintain the perfect balance of a crank in all positions of a shiftable crank pin has ever before been proposed.

Referring to the drawings, 21 designates a crank disk which is fixed to one end of a shaft 22 by means of a flared collar 23 and screws 24. A deep groove 25 is formed in the crank disk 21 and extends in a straight line across the axis of the crank disk and to near its periphery at opposite sides. A shaft 26 is journaled at its opposite ends in the crank disk 21 and lies within the groove 25, longitudinally thereof. The shaft 26 is threaded in one direction from near one of its ends to near its center and in the opposite direction from near its opposite end to near its center. A bevel gear wheel 27 is fixed to the shaft 26 near one of its ends and extends through the crank disk 21 in a slot 28. A balancing weight 29 equal to the said bevel gear wheel 27 is secured to the crank disk 21 at the opposite side from that occupied by the bevel gear wheel 27. That is, the weight of the balancing weight 29 is such that, in its fixed position, it balances the weight of the gear wheel 27 in excess of the weight of the material taken out of the crank disk 21 in forming the slot 28.

A crank block 30 is adapted to slide longitudinally of and in the groove 25 and has an opening therethrough for the passage of the threaded shaft 26, which opening is internally threaded to engage with the threads of the shaft 26 upon one side of the center of the shaft 26. A counter-weight block 31 is also adapted to slide longitudinally of and in the groove 25 and is also provided with an internally threaded opening through which the shaft 26 passes and with which threads the threads of the shaft 26 engage. As the counter-weight block 31 is disposed in the groove 25 upon the opposite side of the center of said groove 25 from the crank block 30 and at an equal distance from the center of rotation of the crank disk 21 the part of the shaft 26 which engages the internal threads in the opening through the counter-weight block 31 is oppositely threaded to that portion of the shaft 26 which engages its threads with the internal threads in the opening through the crank block 30. Therefore any rotation of the shaft 26 in either direction will cause both the crank block 30 and the counter-weight block 31 to approach or to recede from the center of rotation of the crank disk 21 at the same time and in equal degrees. The weight of the counter-weight block 31 is such as to equalize the weight of the crank block 30 and the portion of the weight of its connections that is distributed therethrough. It will thus be evident that the simultaneous movements of the crank block 30 and the counter-weight block 31 will always keep the crank disk 21 in balance.

Rotation of the shaft 26, through the bevel gear wheel 27 causes simultaneous movement of the crank block 30 and the counter-weight block 31. When the rotation is in one direction, both of the said blocks will approach opposite ends of the shaft 26 until they reach the short unthreaded portions of the shaft 26, when they will be moved no further and will retain their respective positions. When the rotation of the shaft 26 is in the opposite direction, the said blocks will approach each other and will meet at the center of the crank disk 21. When arrived in that position, they will each be on the unthreaded central portion of the shaft 26 and will, therefore, have no tendency to press further together or to bind the mechanism.

Both of the said blocks are of peculiar shapes which adapt them to closely approach each other at the center, while balancing the crank disk 21, and to permit the crank pin 32 to be secured to the crank block 30 in such position that the crank pin 32 will be at the exact center of rotation of the crank disk 21 when the said two blocks are at their central positions. The shapes of these blocks are best illustrated in Figure 4 of the drawings, where they are shown in section. A collar 33 is fixed upon the shaft 26 at the exact center of rotation of the crank disk 21.

To retain the blocks 30 and 31 within the groove 25, strips 34 are secured to the face of the crank disk 21 and along the edges of the groove 25 by means of screws 35 in such manner that the strips 34 project slightly over the edges of the groove 25 and form flanges along each side of the groove 25.

A crank arm 36 is pivoted upon the crank pin 32 at one of its ends and pivoted upon a rack frame 37 at its opposite end. The rack frame 37 is adapted to slide back and forth in grooved tracks or slideways 38 which are secured to the frame 39 of the machine. Rollers 40 are spaced apart in the grooves formed in the tracks 38 and are journaled in the flanges 41 which are formed in the tracks 38 through the cutting of the grooves therein. The rack frame 37 is in contact with these rollers 40 in its sliding movements and thus has less frictional resistance to overcome than it otherwise would. Thus, the rotation of the crank disk 21 causes the crank arm 36 to communicate reciprocal sliding movement to the rack frame 37 varying in extent according to the position of the crank block 30 on the crank disk 21. For the sake of compactness, I have shown tracks or slideways 38 and the rack frame 37 directly under the crank disk 21, but it will be evident that these could as well be extended for any distance and in any direction as long as they were aligned with the axis of the crank disk 21.

The rack frame 37 is provided with racks 42 and 43 disposed upon opposite sides thereof and upon differing planes, the rack 42 being somewhat higher on the rack frame 37 than the rack 43, so that each of the said racks can engage separate gear wheels or pinions on a shaft set between without interference from each other. A shaft 44 is journaled in a bracket 45 formed in the frame 39 of the machine and a bevel gear wheel 46 is fixed upon the shaft 44 for rotation therewith. Ratchet wheels 47 and 48, having oppositely disposed teeth respectively, are also fixed to the shaft 44 for rotation therewith and gear wheels 49 and 50 are loosely mounted upon the shaft 44 for free rotation thereon. A collar 51 separates the gear wheels 49 and 50 and maintains them in such position upon the shaft 44 that the gear wheel 49 is adjacent the ratchet wheel 47 and the gear wheel 50 is adjacent the ratchet wheel 48. The gear wheels 49 and 50 are each provided with pawls 52 and 53 respectively disposed to engage the ratchet teeth of the adjacent ratchet wheels. The pawls 52 and 53 are pivoted upon their respective gear wheels by means of pins 54 and are pressed into engagement by means of springs 55 held in split-pins 56. The movement of the rack frame 37 in one direction rotates the shaft 44 through the engagement of the rack 42 with the gear wheel 49 and the locking of the gear wheel 49 to the fixed ratchet wheel 47 on the shaft 44 by means of the pawl 52. During the movement of the rack frame 37 in that direction, the rack 43 rotates the gear wheel 50 but this does not rotate the ratchet wheel 48 because its teeth are oppositely disposed to those of the ratchet wheel 47 and the pawl 53 is also oppositely disposed to the pawl 52. On the return motion of the rack frame 37 the gear wheel 50 and the ratchet wheel 48 rotate the shaft 44, while the gear wheel 49 and ratchet wheel 47 are out of operative engagement. Thus, continuous rotary motion of the shaft 44 in one direction is secured, and it will be noted that this conversion of reciprocal into rotary motion will continue however the range of the reciprocal movements of the rack frame 37 may be modified or limited.

A bevel gear wheel 57 is fixed upon a driven shaft 58 for rotation therewith and engages the bevel gear wheel 46. The shaft 58 is journaled in the machine frame 39 and either connects directly with the mechanism to be operated or does so through reversing gears 59, forming no part of my invention.

Thus far, the mechanism provided for converting rotary motion of the crank disk 21 into reciprocating motion of the rack frame 37 and then reconverting that reciprocating motion into rotary motion of the driven shaft 58 has been described, and it is evident that the ratio of the rotary speed of the driven shaft 58 to the rotary speed of the crank disk 21 may be varied within wide limits by changing the position of the crank block 30 with respect to the axis of rotation of the crank disk 21. It has also been shown how rotation of the bevel gear wheel 27 and the threaded shaft 26 in either direction will cause changes in position of the crank block 30 and the counter-weight block 31. Up to this point there is no difference in construction between the hand controlled mechanism forming the subject of this application and the automatically controlled embodiment of my invention forming the subject of my application for Letters Patent filed April 4th, 1921, Serial No. 458,638.

In the hand controlled embodiment, the periphery of the crank disk 21 is beveled and supplied with bevel gear teeth 60, making the crank disk 21, in effect, a large bevel gear wheel. A bevel gear wheel 61 fixed upon a power shaft 62 engages the bevel teeth 60 of the crank disk 21. Thus, the power shaft 62 drives the crank disk 21. A long sleeve 63 surrounds the shaft 22 and has one of its ends secured to a bevel gear wheel 64 by means of a flange 65 and screws 66. The sleeve 63 and the bevel gear wheel 64 are free to rotate upon the shaft 22 and the bevel gear wheel 64 is separated from the flange or flared collar 23 on the shaft 22 by a washer 67.

An inner sleeve 68 surrounds the shaft 22 and is slidable upon that shaft longitudinally thereof. The inner sleeve 68 slides within the sleeve 63 and is provided with an internally projecting key 69 which engages in a keyway 70 cut in the shaft 22 longitudinally thereof and which permits longitudinal sliding movement of the sleeve 68 upon the shaft 22 while securing the shaft 22 and the sleeve 68 together for rotation. A spiral groove 71 is formed in the outer surface of the sleeve 68 with a steep slant. A screw pin 72 passes through an internally threaded opening in the sleeve 63 and its end projects into the groove 71.

Two fixed collars 73 surround the sleeve 68 near its upper end and are spaced apart to form a circumferential raceway for the ends 74 of a bifurcated portion 75 of an arm 76. The bifurcated portion 75 is bent at right angles to the balance of the arm 76 and this balance of the arm 76 is of a form square in cross section and passes through a square opening 77 in a bracket 78 secured to the machine frame 39 by means of screws 79.

The sleeve 63 is journaled in a bearing 80 forming part of the frame 39 of the machine, and a collar 81 is fixed upon the sleeve 63 below the bearing 80 to prevent upward movement of the sleeve 63 and another collar 82 is fixed upon the sleeve 63 above the bearing 80.

A collar 83, provided with an annular groove 84, is fixed upon the arm 76 near its upper end and the arm 76 is of cylindrical shape above this collar 83. Ends 85 of a bifurcated portion 86 of a sleeve 87 project into the groove 84 of the collar 83 and the cylindrical end of the arm 76 fits into a cylindrical opening 88 which passes longitudinally through the sleeve 87. The outside of the sleeve 87 is provided with threads 89 which engage with internal threads in an opening 90 in the machine frame 39 through which the sleeve 87 is adapted to move spirally. A shaft 91 is partially surrounded by the sleeve 87 and is provided with a longitudinal keyway 92 which is engaged by an internally projecting key 93 upon the sleeve 87. The shaft 91 is journaled in a bracket 94 which is secured to the machine frame 39 by means of screws 95. The shaft 91 is provided with a hand wheel 96 for the convenience of the operator in adjusting the speed ratio of the driven and driving shafts.

A pinion 97 is fixed upon the shaft 91 for rotation therewith and meshes with a gear wheel 98 which is freely rotatable upon a stub shaft 99 projecting upwardly from the bracket 94 and the gear wheel 98 is held upon the stub shaft 99 by a collar 100 which is fixed upon that shaft. The upper surface of the gear wheel 98 is provided with numerals circumferentially graduated around it so that a pointer 101, secured upon an arm 102, points to whatever numeral may be adjacent thereto and indicates the ratio of speed existing between the driving and driven shafts as the mechanism is adjusted at that time. The arm 102 may be either integral with the bracket 94 or secured thereto in any manner.

When the operator turns the hand wheel 96, the pinion 97 rotates the gear wheel 98 so that the pointer 101 indicates a different numeral or graduation upon the gear wheel 98. Since the pinion 97 is smaller in diameter than the gear wheel 98, it will require several complete turns of the hand wheel 96 to effect a complete rotation of the gear wheel 98.

At the same time, the turning of the hand wheel 96 turns the shaft 91 to which it is fast and this turns the sleeve 87 because of the shaft 91 and sleeve 87 being locked together for rotation by the key 93 and the keyway 92. As the sleeve 87 rotates it will spiral upwardly or downwardly through the opening 90 according to the direction of its rotation and will carry the arm 76 with it in either direction through the ends 85 of the bifurcated portion 86 of the sleeve 87 engaging in the groove 84 in the collar 83 upon the arm 76. The arm 76 is prevented from rotating with the sleeve 87 through its square form and the square opening 77 through which it slides.

The upward or downward movement of the arm 76 carries with it the sleeve 68 through the lifting or pushing action of the ends 74 of the bifurcated portion 75 of the arm 76 in the groove or raceway formed by the collars 73 upon the sleeve 68. Since the sleeve 68 is feathered upon the shaft 22, it is free to slide longitudinally thereon. As it does so, the end of the screw pin 72 which projects into the spiral groove 71 in the outer surface of the sleeve 68 will cause the outer sleeve 63 to be rotated independently of the shaft 22, either in the direction of the rotation of the shaft 22 or in the contrary direction, and this will rotate the bevel gear wheel 64 to which the sleeve 63 is fixed. Rotation of the bevel gear wheel 64 independently of its normal rotation with the shaft 22 will rotate the bevel gear wheel 27 and the shaft 26, causing readjustment of the crank block 30 and the counter-weight block 31, as previously described, and will adjust the rotary speed ratio of the driving and driven shafts as desired by the operator.

It will be evident that numerous departures from the construction herein described might be made without in any way departing from the spirit of my invention. I do not, therefore, wish to be limited to the specific construction described, but to be limited only by my following claims and the prior state of the art.

I claim:

1. In crank transmission mechanism, the combination of a rotatable member, a wrist-pin movable radially of and upon the said rotatable member, a counter-weight movable radially of and upon the said rotatable member, means for moving the said wrist-pin toward or away from the axis of the said rotatable member at the will of the operator, and automatically operating means for moving the said counter-weight in the opposite direction and in equal degree to the movements of the said wrist-pin.

2. In crank transmission mechanism, the combination of a rotatable member, a wrist-pin, a counter-weight, means for moving the said wrist-pin radially of and upon the said rotatable member, and automatically operating means for moving the said counter-weight radially of and upon the said rotatable member so that the said counter-weight will always be spaced at equal distance from the axis of rotation of the said rotatable member as the said wrist-pin and upon the opposite side of said axis from the said wrist-pin.

3. In crank transmission mechanism, the combination of a rotatable member, a shaft journaled upon said rotatable member for independent rotation thereon, a wrist-pin movable upon said shaft radially of the said rotatable member, a counter-weight movable upon said shaft radially of the said rotatable member in opposite direction to the movement of the said wrist-pin, means for independenty rotating the said shaft, and means controlled by the direction and degree of rotation of the said shaft for moving the said wrist-pin and the said counter weight in opposite directions and in like degrees to each other.

4. In crank transmission mechanism, the combination of a rotatable member, a wrist pin movable radially of and upon the said rotatable member between the axis thereof and the periphery thereof, a counter weight block movable radially of and upon the said rotatable member between the axis thereof and the periphery thereof and upon the opposite side of the axis thereof from the said wrist pin, and means for causing the said wrist pin and the said counter weight block to move in unison to equal distances from the axis of said rotatable member at the will of the operator.

5. In crank transmission mechanism, the combination of a driving shaft, a rotatable member secured upon said driving shaft, a threaded shaft rotatably mounted upon the said rotatable member, an internally threaded member upon the said threaded shaft in screw engagement therewith and movable radially of the said rotatable member and longitudinally of and upon the said threaded shaft when the said threaded shaft is rotated, a bevel gear wheel secured upon the said threaded shaft, a bevel gear wheel normally rotatable with the said first mentioned shaft but adapted to rotate independently thereof and engaging with the said bevel gear wheel upon the said threaded shaft in such manner as to rotate said bevel gear wheel and said threaded shaft when said second named bevel gear wheel is rotated independently of the said driving shaft, a sleeve splined upon said driving shaft, a spiral groove in said sleeve, a member secured to said second named bevel gear wheel and engaging with said spiral groove in said sleeve, and non-rotatable means for moving said sleeve longitudinally of and upon the said driving shaft at the will of the operator.

6. In crank transmission mechanism, the combination of a rotatable member, a threaded shaft journaled upon said rotatable member for independent rotation thereon, an internally threaded member mounted upon the said threaded shaft in screw engagement therewith and adapted to be moved to a point coincident with the axis of rotation of the said rotatable member or to any point upon the said threaded shaft between the said axis of rotation of the said rotatable member and one end of the said threaded shaft by the rotation of the said threaded shaft, and a second internally threaded member mounted upon the said threaded shaft in screw engagement therewith and adapted to be moved to like extent and in an opposite direction to the said first named internally threaded member by the rotation of the said threaded shaft.

7. In crank transmission mechanism, the combination of a rotatable member, a shaft journaled upon the said rotatable member near opposite edges thereof and crossing the axis of rotation thereof, threads upon the said shaft running in opposite directions upon the said shaft at opposite sides of the point where the said shaft crosses the axis of rotation of the said rotatable member, and two internally threaded members mounted upon the said shaft upon opposite sides of the said axis of rotation of the said rotatable member and at equal distances from said center of rotation of said rotatable member in screw engagement with the said shaft.

8. In crank transmission mechanism, the combination of a rotatable member, a shaft journaled for independent rotation upon the said rotatable member near opposite edges thereof and crossing the axis of the said rotatable member, threads upon the said shaft running in opposite directions thereon at opposite sides of the point where the said shaft crosses the axis of the said rotatable member, an internally threaded crank block mounted upon the said shaft at one side of the said point and adapted to be moved longitudinally of and upon the said shaft by the independent rotation of the said shaft in either direction, an internally threaded weight member mounted upon the said shaft upon the opposite side of the said point from the said crank block and at an equal distance from the said point and adapted to be moved longitudinally of and upon the said shaft an equal distance and in an opposite direction to the said crank block by the independent rotation of the said shaft, and means for rotating the said shaft.

9. In crank transmission mechanism, the combination of a rotatable member, a shaft journaled near opposite edges of and upon the said rotatable member for independent rotation thereon and crossing the axis thereof, threads upon that part of the said shaft at one side of the point where the said shaft crosses the axis of the said rotatable member, oppositely disposed threads upon that part of the said shaft at the opposite side of the said point, an internally threaded crank block mounted upon that part of the said shaft at one side of the said point and in screw engagement therewith in such manner as to be moved longitudinally of and upon the said shaft by the independent rotation of the said shaft in either direction, an internally threaded counter-weight block mounted upon that part of the said shaft disposed upon the opposite side of the said point from that part of the said shaft mounting the said crank block and in screw engagement with said shaft in such manner that the said counter-weight block will approach toward or recede from the said point in unison with and in equal degrees to the said crank block when the said shaft is independently rotated in either direction, and means for rotating the said shaft independently of the said rotatable member while the said rotatable member is either in rotation or at rest.

10. In crank transmission mechanism, the combination of a rotatable member, a shaft journaled near opposite edges of and upon the said rotatable member for independent rotation thereon and crossing the axis thereof, threads upon that part of the said shaft disposed at one side of the point where the said shaft crosses the axis of the said rotatable member, oppositely disposed threads upon that part of the said shaft disposed at the opposite side of the said point, an internally threaded crank block mounted upon that part of the said shaft at one side of the said point and in screw engagement with said shaft in such manner that independent rotation of the said shaft in either direction will cause the said crank block to either approach or recede from the said point, an internally threaded counter-weight block mounted upon that part of the said shaft on the opposite side of the said point from the said crank block, said counter-weight block being in screw engagement with the said shaft and disposed at a like distance from the said point as the said crank block and adapted to be moved toward or away from the said point in unison with and an equal distance as the said crank block whenever the said shaft is independently rotated in either direction, means for rotating the said shaft independently of the said rotatable member while the said rotatable member is either in rotation or at rest, a connecting member pivoted upon the said crank block, a reciprocating member pivoted to the said connecting member and adapted to have reciprocating motion imparted to it through the said connecting member varying in degree according to the position of the said crank block upon the said shaft and relative to the axis of the said rotatable member, and means for reconverting the reciprocal motion of the said reciprocating member into rotary motion of a driven shaft.

CHARLES H. GILL.